US010953999B2

(12) United States Patent
Alcorn et al.

(10) Patent No.: US 10,953,999 B2
(45) Date of Patent: Mar. 23, 2021

(54) UNMANNED AERIAL VEHICLE DOCKING SYSTEM

(71) Applicants: John Alcorn, Taft, TN (US); Stewart King, Somerville, AL (US); Mark Bales, Madison, AL (US); David Brian Landrum, Madison, AL (US)

(72) Inventors: John Alcorn, Taft, TN (US); Stewart King, Somerville, AL (US); Mark Bales, Madison, AL (US); David Brian Landrum, Madison, AL (US)

(73) Assignee: Board of Trustees of the University of Alabama, Huntsville, AL (US), for and on behalf of the University of Alabama in Huntsville ( * ) Notice: Subject to any disclaimer, the term of this patent is extended or adjusted under 35 U.S.C. 154(b) by 0 days.

(21) Appl. No.: 16/543,169

(22) Filed: Aug. 16, 2019

(65) Prior Publication Data
US 2020/0071001 A1 Mar. 5, 2020

Related U.S. Application Data

(63) Continuation of application No. 15/093,382, filed on Apr. 7, 2016, now Pat. No. 10,407,182.

(51) Int. Cl.
*B64F 1/36* (2017.01)
*B64F 1/00* (2006.01)
(Continued)

(52) U.S. Cl.
CPC ............ *B64F 1/362* (2013.01); *B64C 39/024* (2013.01); *B64F 1/007* (2013.01); *B64F 1/125* (2013.01);
(Continued)

(58) Field of Classification Search
CPC .. B64F 1/007; B64F 1/02; B64F 1/025; B64F 1/12; B64F 1/125; B64F 1/22; B64F 1/28;
(Continued)

(56) References Cited

U.S. PATENT DOCUMENTS 2,939,657 A 6/1960 Westcott
4,236,686 A 12/1980 Barthelme
(Continued)

OTHER PUBLICATIONS

Alcorn, et al., U.S. Appl. No. 15/093,382, entitled, "Unmanned Aerial Vehicle Docking System," filed Apr. 7, 2016.

*Primary Examiner* — Richard R. Green
(74) *Attorney, Agent, or Firm* — Maynard Cooper & Gale, P.C.; Jon E. Holland

(57) ABSTRACT

An unmanned aerial vehicle docking system can include a docking arm and a docking station. The docking arm can be mounted on the UAV and include a rod with an interface element positioned on top of the rod. The interface element can have charging contacts that are attached to wires that extend down to a charging circuit on the UAV. The docking station can be located separate from the docking arm and have a guidance cone to direct the docking arm to a capture mechanism. Once the interface element is in the capture mechanism, a charging dome is then lowered down onto the top of the interface element to form a circuit between a power source at the docking station and the UAV's battery. Upon completion of the charging process, the charging dome is raised and the capture mechanism releases the interface element of the UAV.

20 Claims, 12 Drawing Sheets

Related U.S. Application Data

(60) Provisional application No. 62/144,288, filed on Apr. 7, 2015.

(51) Int. Cl.
*B64F 1/12* (2006.01)
*B64C 39/02* (2006.01)

(52) U.S. Cl.
CPC .. *B64C 2201/066* (2013.01); *B64C 2201/146* (2013.01); *B64C 2201/182* (2013.01)

(58) Field of Classification Search
CPC ...... B64F 1/36; B64F 1/362; B64C 2201/066; B64C 2201/182
See application file for complete search history.

(56) References Cited

U.S. PATENT DOCUMENTS

| | | |
|---|---|---|
| 4,523,729 A | 6/1985 | Frick |
| 8,245,370 B2 | 8/2012 | Ritter |
| 8,418,959 B2 | 4/2013 | Kang |
| 9,387,940 B2 | 7/2016 | Godzdanker |
| 9,704,409 B2 | 7/2017 | Prakash |
| 9,862,285 B2 | 1/2018 | Lee |
| 9,873,524 B2 | 1/2018 | Fisher |
| 10,407,182 B1 * | 9/2019 | Alcorn .................... B64F 1/362 |
| 2017/0217323 A1 | 8/2017 | Antonini |

* cited by examiner

UNMANNED AERIAL VEHICLE DOCKING SYSTEM

CROSS-REFERENCE TO RELATED APPLICATIONS

This application is a continuation of U.S. application Ser. No. 15/093,382, filed on Apr. 7, 2016, entitled, "Unmanned Aerial Vehicle Docking System," which is incorporated herein by reference in its entirety. U.S. application Ser. No. 15/093,382 claims priority to U.S. Provisional Application No. 62/144,288, entitled "Unmanned Aerial Vehicle Docking System and Adapter," and filed Apr. 7, 2015, which application is hereby incorporated by reference in its entirety.

BACKGROUND

The present application generally relates to a docking system for an unmanned aerial vehicle.

Unmanned aerial vehicles (UAVs), particularly small UAVs (SUAVs), are becoming increasingly important in military, industrial, and business applications. However, the flight time of most SUAVs, particularly quadcopters and rotorcraft SUAVs, is severely limited by the relatively small amount of energy they can carry for flight. Various approaches to recharging and/or refueling of UAVs have been suggested, but such approaches lack versatility and can be expensive to install and maintain.

SUMMARY

The present application generally pertains to an unmanned aerial vehicle docking system that includes a docking arm on the unmanned aerial vehicle and a docking station. The docking arm can include a rod with an interface element positioned on top of the rod. In one embodiment, the interface element may be round, for example, sphere shaped, although other shapes are possible in other embodiments. Charging contacts, which can be attached to wires that extend down to a charging circuit on the UAV, are placed on the interface element. The docking station can have a pyramidal guidance cone that the docking arm can use for positioning during the docking process. After using the guidance cone to position the docking arm, the docking arm can pass through a pair of horizontally positioned levers, herein referred to as "flippers", rotating them upward until the interface element of the docking arm passes between the flippers. The flippers can then return to the horizontal position and are held in the horizontal position by two pins. The pins allow the flippers to rotate upward but prevent the flippers from rotating past the horizontal position, i.e., rotate downward. The UAV can then be throttled down and the interface element can rest on top of the flippers. A charging dome is then lowered down onto the top of the interface element. The flippers can have charging contacts that contact the charging contact(s) on the bottom of the interface element, and the charging dome has charging contacts that contact the charging contact(s) on the top of the interface element. The electrical connections between the contacts can form a circuit between a power source at the docking station and the UAV's battery. When the UAV is to be released after completing the charging process, the charging dome is raised and the pins which hold the flippers in the horizontal position are retracted allowing the flippers to rotate downward. The weight of the UAV causes the flippers to rotate downward, and the UAV is released from the docking station. Springs or other such mechanisms can be placed around the back of the flippers to cause the flippers to return to the horizontal position after a downward rotation. Once the flippers are in the horizontal position after releasing the UAV, the pins can be extended outward to prepare for another docking procedure.

One advantage of the present application is it increases UAV flight time by permitting the UAV to recharge.

Another advantage of the present application is that it can be used with one or more UAVs.

A further advantage of the present application is that it can enable the performance of tasks that UAVs would be unable to perform without a recharge or exchanging data.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
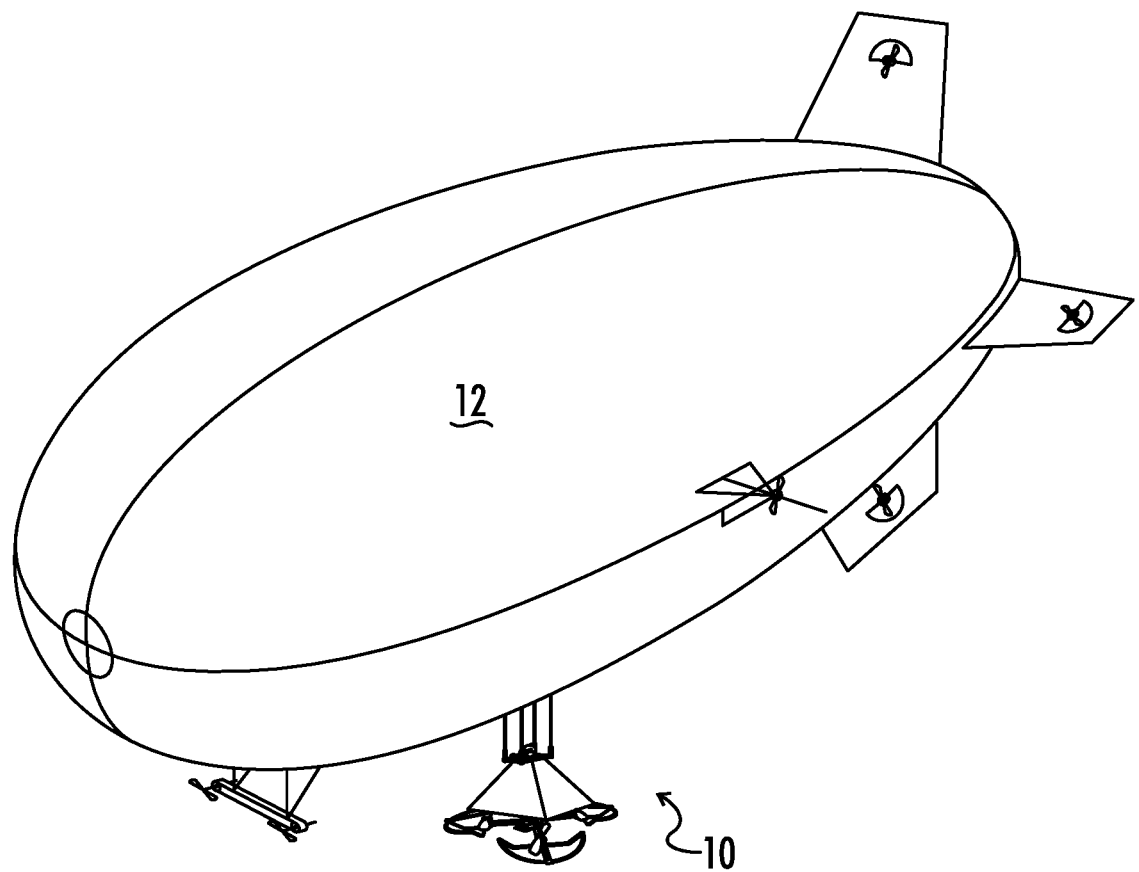
FIG. 1 shows an embodiment of a docking station connected to an aerial vehicle.

The present disclosure is directed to an unmanned aerial vehicle docking system and adapter. The docking adapter for the unmanned aerial vehicle (UAV) includes a rod with an interface element positioned on top of the rod. In one embodiment, the interface element may be round, for example sphere shaped. The interface element can be referred to herein as a "docking ball" or a "sphere", although other shapes are possible in other embodiments. Charging contacts, which are attached to wires that run down to a charging circuit on the UAV, are placed on the docking ball. The docking station has a pyramidal guidance cone that the docking ball engages during the docking process. During docking, the docking ball passes through a pair of levers, herein referred to as "flippers", rotating them upward until the docking ball passes through. The flippers fall down into a horizontal position and are held there by two pins, which allow the flippers to rotate upward but prevent the flippers from falling below the horizontal position. When the UAV is throttled down, the docking ball comes to rest on the flippers, and the UAV is captured. A charging dome is then lowered down onto the top of the docking ball. The flippers have charging contacts that contact the charging contact on the bottom of the docking ball, and the charging dome has a charging contact that contacts the charging contact on the top of the docking ball. This completes a circuit between a power source on the docking station and the UAV's battery. When the UAV is to be released, the charging dome is raised and the pins which hold the flippers in the horizontal position are retracted allowing the flippers to rotate downward. The weight of the UAV causes the flippers to rotate downward, and the UAV falls out of the docking mechanism. Springs or other such mechanisms are placed around the back of the flippers to cause the flippers to return to the horizontal position after they have rotated downward, releasing the UAV, and the pins are then pushed back out to prepare for another dock.

The docking station or docking mechanism can capture and recharge the UAV. The docking mechanism has the ability to keep the UAV attached to the docking station, the ability to deploy the UAV on command, the ability to capture the UAV mid-flight, and the ability to transfer energy to the UAV to recharge the battery of the UAV. The docking mechanism can passively hold the UAV and allow the UAV to dock. The docking station or docking mechanism has at least four components: a guidance device, a capture mechanism, a system of charging contacts and circuitry, and a connection interface. The guidance device can be used to increase the allowable navigational error during the docking maneuver, and to guide the UAV into the capture mechanism. The capture mechanism can be used to capture the UAV, deploy the UAV on demand, and make electrical contact with the UAV for charging. The charging contacts and circuit permit energy to be transferred to the UAV battery. The connection interface can be used to connect the docking mechanism to a mounting structure on an object.

The guidance device permits pilot navigational error during the docking maneuver by allowing the docking adapter on the UAV to slide up the surface of the guidance device into the capture mechanism. By permitting some navigational error, the guidance device can be useful during the docking process because of the amount of drift the UAV may experience and the relatively slow response time of the human pilot of the UAV. In one embodiment, the guidance device may be fabricated using 0.020 inch thick polycarbonate plastic sheets, with aluminum rivets as fasteners. However, other materials, dimensions, and fasteners can be used in other embodiments. The polycarbonate sheets are unlikely to fracture from an impact with the UAV and provide durability to the guidance device. The polycarbonate sheets may be cut into triangular shapes with a flange at the top or narrow end of the guidance device. The sides of the sheets may be joined with rivets to form a frustum shape (truncated pyramid). The guidance device may have a predetermined height so that the guidance device can prevent the UAV from swinging excessively while the UAV is docked to the docking mechanism. In one embodiment, the flanges at the narrow end of the guidance device attach to the central frame of the docking mechanism using 4-40 buttonhead cap screws to minimize the amount of interference with the docking ball during the docking maneuver. However, in other embodiments, other types of fasteners can be used.

The capture mechanism was designed to allow the UAV to passively connect to the docking station and deploy the UAV upon command from the ground station. The capture mechanism (see FIG. 4) includes of a central frame and at least two "flipper" parts each of which are free to rotate about an axle on the central frame.

The central frame can be used to hold all of the parts of the docking mechanism together. The central frame includes of a simple rectangular part with mounting holes for each component, cutouts for the flippers, and a circular cutout for the sphere to pass through. In one embodiment, the frame may be fabricated out of polycarbonate plastic by computer numerical control (CNC) machining. However, other fabrication techniques can be used in other embodiments Each flipper is restricted from travelling below the substantially horizontal position by a small pin. The pin is a part of a linear actuator that can be retracted to allow the flippers unrestricted motion about their axles. Thus, when the pin is extended, the flipper may only move in the upward direction, allowing the sphere on the UAV to pass through and be captured. When the pin is retracted, the flippers are free to give way under the weight of the UAV, thus allowing the UAV to deploy. Elastic bands or springs may be used to ensure that the flippers return to the horizontal position, thus preventing the flippers from staying in the upright position after the sphere moves upward during docking, and preventing the flippers from staying in the downward position after the UAV deploys.

The linear actuators can control the position of the flipper restriction pin. The linear actuator can provide a force sufficient to overcome the frictional force between the pin and the flipper due to the weight of the docked UAV rotor. A travelling-nut linear actuator may be used in one embodiment. The linear actuator may include a servo motor, a threaded rod, a pin (travelling-nut, threaded), a limit switch, and a housing (see FIG. 5). A separate circuit board may control both linear actuator motors simultaneously or each linear actuator may have its own circuit board for control. The linear actuator housings may be 3D-printed from ABS plastic in one embodiment, but may be fabricated using other techniques in other embodiments. The housing can be used to constrain the servo motor to the central frame and act as a channel for the pin to travel through. In one embodiment, the pins may be machined from polytetrafluoroethylene plastic. However, in other embodiments, different materials can be used for the pins. A threaded hole through the pin allows the pin to travel linearly when a threaded rod connected to the servo motor spins. A limit switch detects when the pin has fully retracted as the actuator would be damaged if the pin were to be retracted too far, and the UAV would not be able to deploy if the pin were not retracted far enough. In one embodiment, servo motors may be modified to be able to rotate continuously by removing a mechanical gear limit in the motor and an internal potentiometer. The servo motor can have a three wire interface with a pair of wires for power (e.g., 5 V) and one for ground. The direction and magnitude of the rotation of the servo motor can be controlled over a single wire using pulse width modulation (PWM).

The linear actuators may be controlled simultaneously using a circuit board mounted on the central frame. The circuit board has the ability to receive a digital signal to deploy the UAV. Upon receipt of the digital deploy signal from either a user or a control circuit, the circuit board outputs PWM signals to each servo motor, and continues to do this until a digital signal denoting a full retract of the pin of the linear actuator has been received by the circuit board from both limit switches. In one embodiment, the circuit board can include a microcontroller board, drop-down resistors for each limit switch, and status indication LEDs.

The battery charging hardware may provide a passive and safe method of transferring energy from the docking mechanism to the UAV motor. Conductive charging may be utilized (as opposed to inductive charging or mechanically replacing the battery). Thus, the charging scheme involves making physical contact between the positive and negative terminals of the UAV motor's flight battery and a dedicated charging battery associated with the docking station, e.g., a battery located on the airship or other location. Contact is made using the sphere (interface element) mounted at the top of the UAV rotor's docking adapter (see FIGS. 12 and 13). In one embodiment, the upper hemisphere acts as a positive terminal and the lower hemisphere acts as a negative terminal, but the terminals may be reversed in another embodiment. These two terminals make contact with corresponding contacts on a "dome" part (positive) and the top of both flippers (negative), respectively. In one embodiment, the dome may be fabricated by 3D-printing ABS plastic. A linear actuator attached to the dome lowers the dome onto the sphere after the UAV docks, and raises the dome after the UAV rotor deploys. In one embodiment, the terminals may be fabricated using conductive copper tape (the adhesive side of the copper tape is not conductive), with solder to join the separate strips.

The docking mechanism is designed so that the positive and negative terminals do not make physical contact as the top and the bottom of the sphere can't make contact. The avoiding of physical contact between the positive and negative terminals prevents a short circuit in the batteries used on both the UAV and the docking station. Because the flippers holding the negative terminals cannot fit inside the dome to make contact with the positive terminals, the positive and negative terminals on the docking mechanism are prevented from making contact as well. The positive terminal on the docking mechanism is prevented from making contact with negative terminal on the UAV because the guidance device restricts the UAV from swinging more than a small angle (<15°) while the docking arm is within the guidance device. The charging circuit, located on the UAV includes a circuit board that can detect the status of the battery and regulate the current from the docking station.

Figure 3:
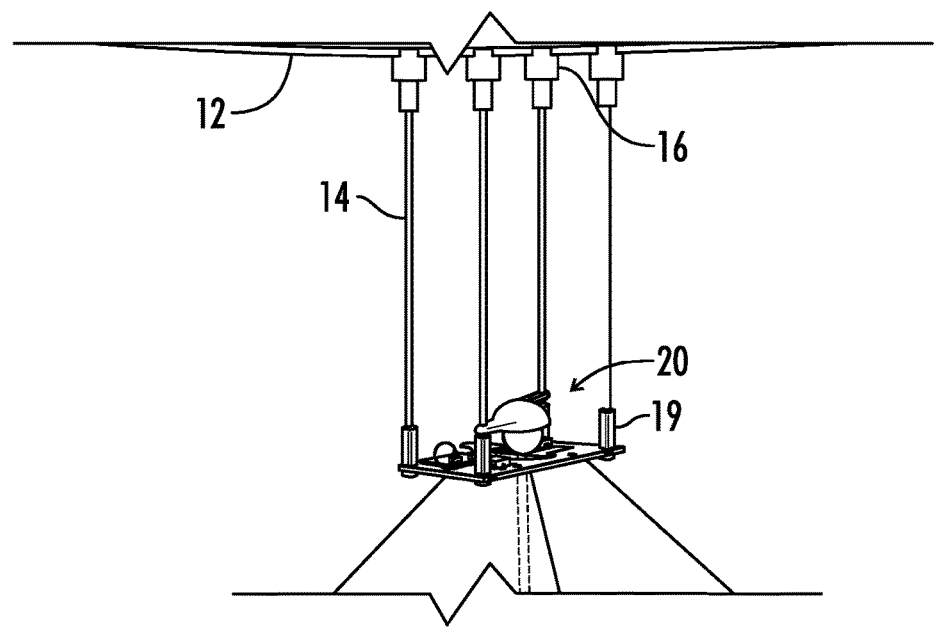
FIG. 3 shows an embodiment of a mounting arrangement for connecting the docking station to the aerial vehicle.

The docking mechanism may interface with a mounting structure using one or more rods with connectors attached at each end (see FIG. 3). In one embodiment, the rods may be made of carbon fiber, but other materials may be used in other embodiments. The connectors allow the docking mechanism to be easily disconnected from the mounting structure. In one embodiment, the connectors attach to the docking mechanism using ¼-20 hex screws fabricated by 3D-printing ABS plastic.

In order to securely dock the UAV with the docking station, a docking adapter or arm interfaces with the capture mechanism. The docking adapter can be placed directly above the UAV's center of mass to avoid creating instability in the system. The docking adapter can be strong to avoid breaking while interacting with the docking mechanism. Finally, the docking adapter extends far enough above the plane of the UAV's rotors to avoid any chance of the rotors contacting the guidance device of the docking mechanism during docking.

Components of the docking adapter (see FIG. 9) include a bridge, a rod, and an interface element or sphere. In one embodiment, the bridge and rod can be made of carbon fiber, but other materials can be used in other embodiments. The adapter can be positioned in the center of the UAV spanning the on-board electronics. The rod may be inserted vertically into a hole in the center of the bridge and may be attached, e.g., glued or fastened, to the bridge. The other end of the rod may be inserted into a hole that was drilled half-way into a spherical object. In one embodiment, the spherical object may have a size similar to a foosball. The spherical object interfaces with the flippers on the docking mechanism to secure the UAV rotor during docking (see FIGS. 6A-6C). The spherical object can also support the weight of the UAV when the UAV is docked in the docking station.

The UAV has the ability to recharge its battery through the docking mechanism. Because the UAV must deploy and dock, hardwired connections are not generally preferred for recharging. Therefore, charging pads or contacts are incorporated on the sphere of the docking adapter. Copper tape may be used at the contact locations to conduct current from the docking mechanism charging circuit to the UAV battery. The positive contact is located on the top side of the sphere (see FIG. 12), while the negative contact is located on the underside of the sphere (see FIG. 13).

When the UAV is docked, the negative contact on the sphere rests on the corresponding negative contact on the docking mechanism flippers (see FIG. 4), while the positive contact on the docking mechanism dome presses down on the positive contact of the sphere. Two wires run from the charging contacts on the sphere and down the central rod of the docking adapter. The wires from the sphere connect to a charging circuit of the UAV.

The charging circuit, a TI BQ24650 Evaluation Module 6 in one embodiment, operates similar to a laptop charger. When the charging contacts on the UAV and docking mechanism touch, they connect the charging battery associated with the docking station to the charging circuit. The charging circuit then switches UAV power from the UAV battery to the docking station mounted charging battery and regulates the current between the batteries. When the contacts separate, the charging circuit switches UAV power back to the UAV battery.

A docking camera (see FIG. 10) on the UAV is useful for successful docking operations. The camera, a CMOS camera module in one embodiment, is mounted slightly above the docking adapter bridge and points upwards along the carbon fiber rod with the sphere near the center of view (see FIG. 11). The positioning of the docking camera allows the pilot to easily align the sphere of the docking adapter with the docking cone during flight.

Figure 2:
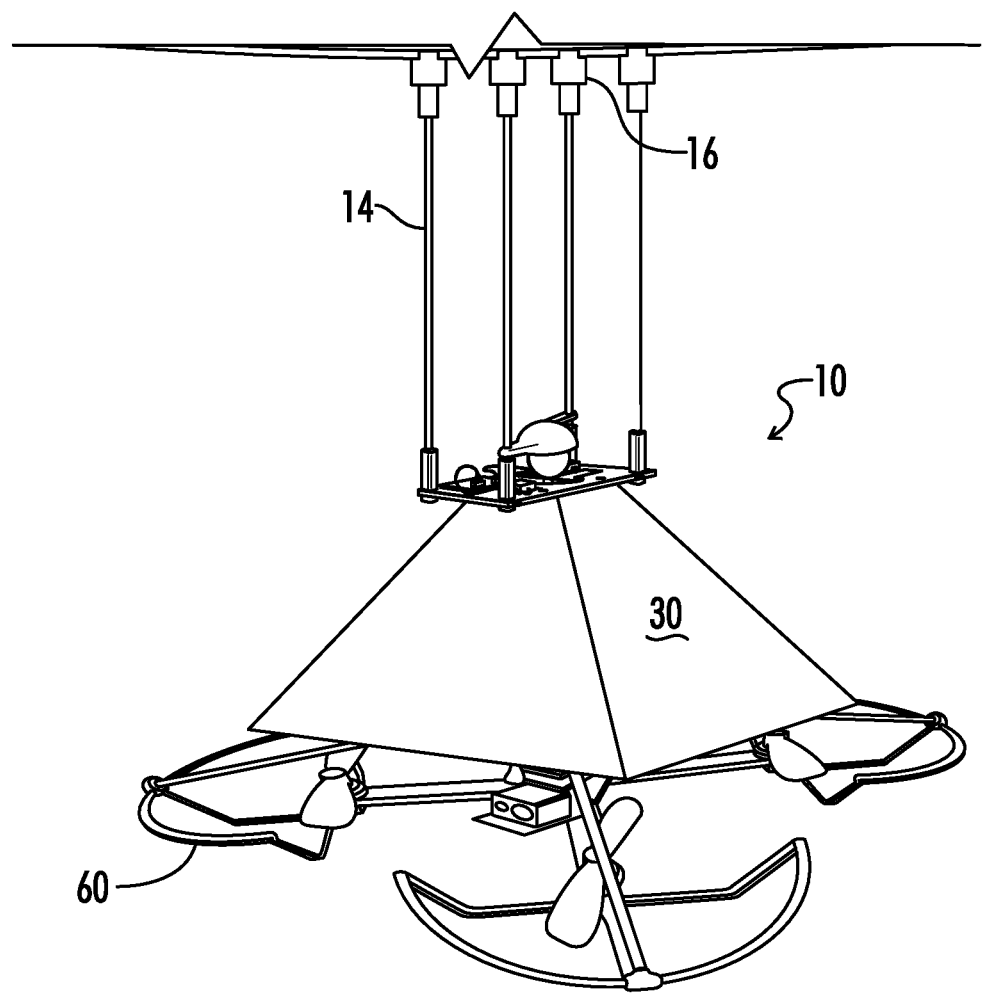
FIG. 2 shows an embodiment of an unmanned aerial vehicle (UAV) docked at the docking station.

Embodiments of the present disclosure shown in FIGS. 1-16 generally pertain to a system for capturing and recharging a UAV. FIGS. 1 and 2 illustrate a docking mechanism or docking station 10 for capturing a UAV 60. As illustrated in FIG. 1, the docking mechanism 10 may be coupled to an object 12. The object 12 can be a moveable object such as an aerial vehicle (e.g., an airship or blimp), a ground vehicle (e.g., a truck or car), or a nautical vehicle (e.g., a boat). In an additional embodiment, the object 12 can be a stationary object, such as a bridge or a building.

Referring now to FIGS. 2 and 3, docking mechanism 10 includes one or more interface cables 14 for attachment to the object 12. Although the embodiment illustrated in FIGS. 2 and 3 illustrate four interface cables 14, other numbers of cables are possible in other embodiments. In one embodiment, cables 14 may be constructed from carbon fiber rods and are secured to the object 12 by detachable connectors 16. Connectors 16 allow the docking mechanism 10 to disconnect from the object 12. The interface cables 14 extend downward from the object 12 or other structure where they are connected to a capture mechanism 20 by a second set of connectors 19. The capture mechanism 20 allows the UAV 60 to passively connect to the docking mechanism 10 and object 12 upon a command from a ground station (not shown).

Figure 4:
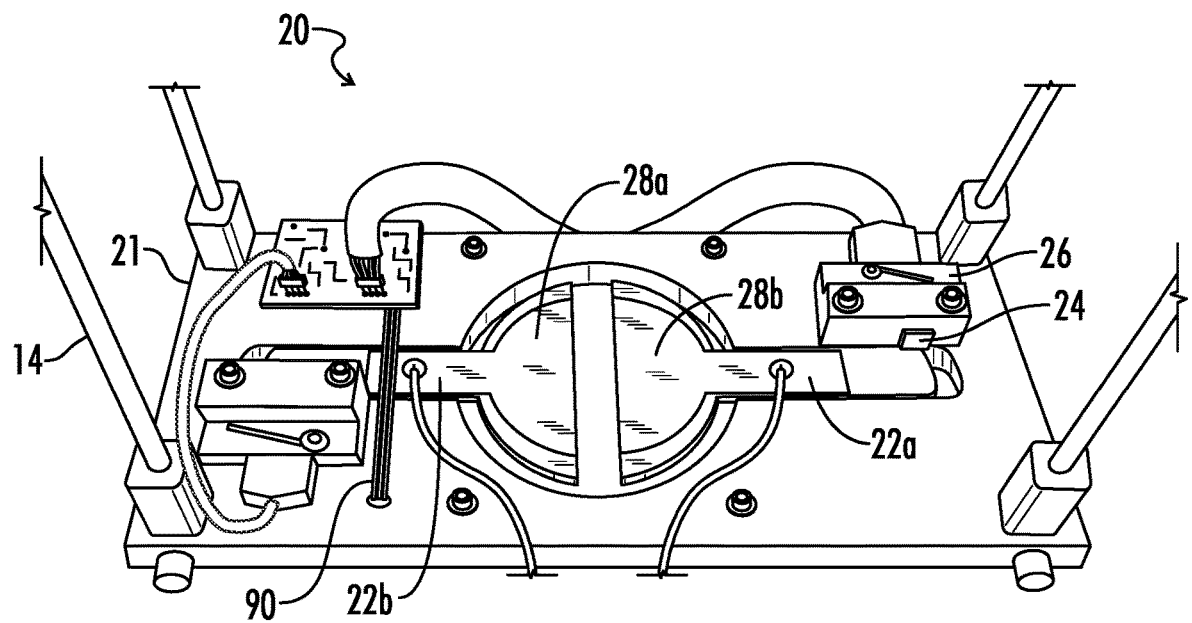
FIG. 4 shows an embodiment of a capture mechanism for the docking station.
Figure 5:
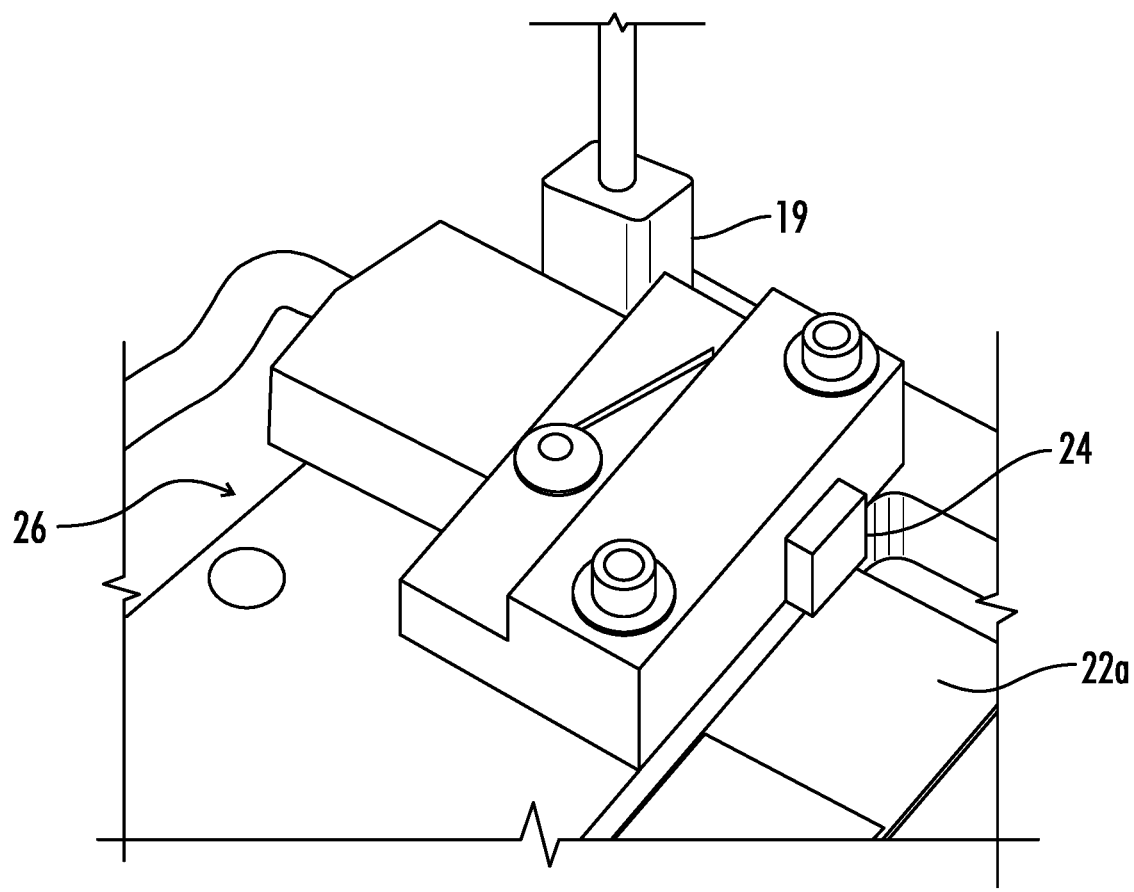
FIG. 5 shows an embodiment of an actuator from the capture mechanism of FIG. 4.

FIGS. 4 and 5 illustrate components of an embodiment of the capture mechanism 20. The capture mechanism 20 includes a frame 21 encasing a set of two flippers 22a and 22b which are rotatable around their respective axels. The movement of each flipper 22a and 22b is controlled through the use of a pin 24 for each flipper 22a and 22b. A corresponding linear actuator 26 controls the movement of each pin 24. In other embodiments, the pins 24 can be moved by other suitable mechanisms. When extended, the pin 24 prevents rotation of the flippers 22a and 22b in a downward direction past the horizontal orientation. Pin 24 may be retracted to allow the flippers 22a and 22b unrestricted motion about their axles.

Figure 6A:
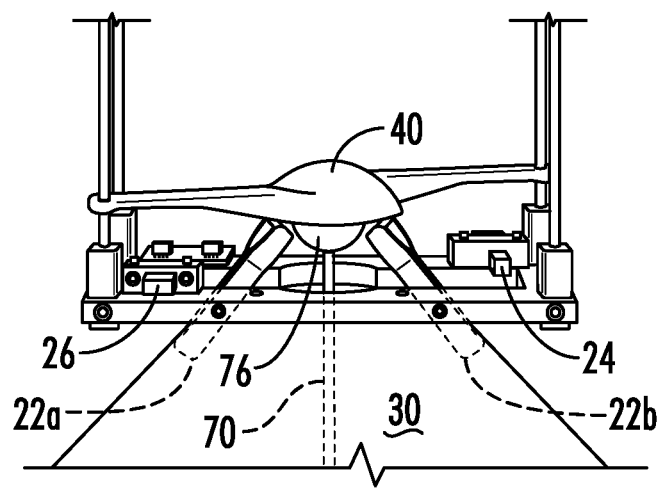
FIGS. 6A-6C show flippers of the capture mechanism of FIG. 4 in different positions.
Figure 6B:
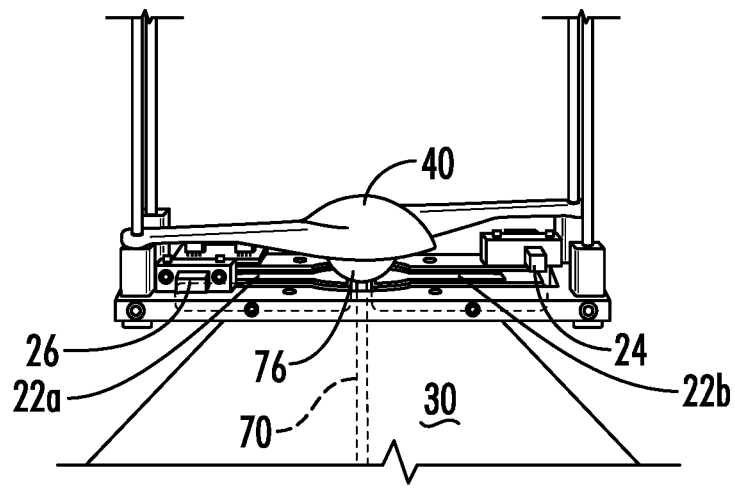
Figure 6C:
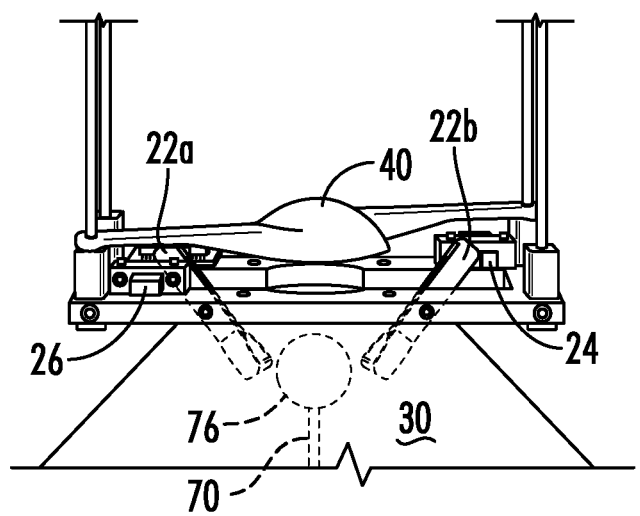

The movement of flippers 22a and 22b is illustrated in FIGS. 6A-6C. FIG. 6A illustrates flippers 22a and 22b rotating upward as the sphere or interface element 76 of the docking adapter or docking arm 70 is inserted into the capture mechanism 20. FIG. 6B illustrates flippers 22a and 22b in the horizontal position holding the sphere 76 and the UAV 60. FIG. 6C illustrates flippers 22a and 22b rotating downwards to release the sphere 76 and UAV 60 after completion of the recharging process. Referring back to FIG. 4, each flipper 22a and 22b includes a charging contact 28a and 28b, respectively. Each charging contact 28a and 28b is electrically connected (via wires) to a power source located on the docking mechanism 10 or the object 12.

Figure 7:
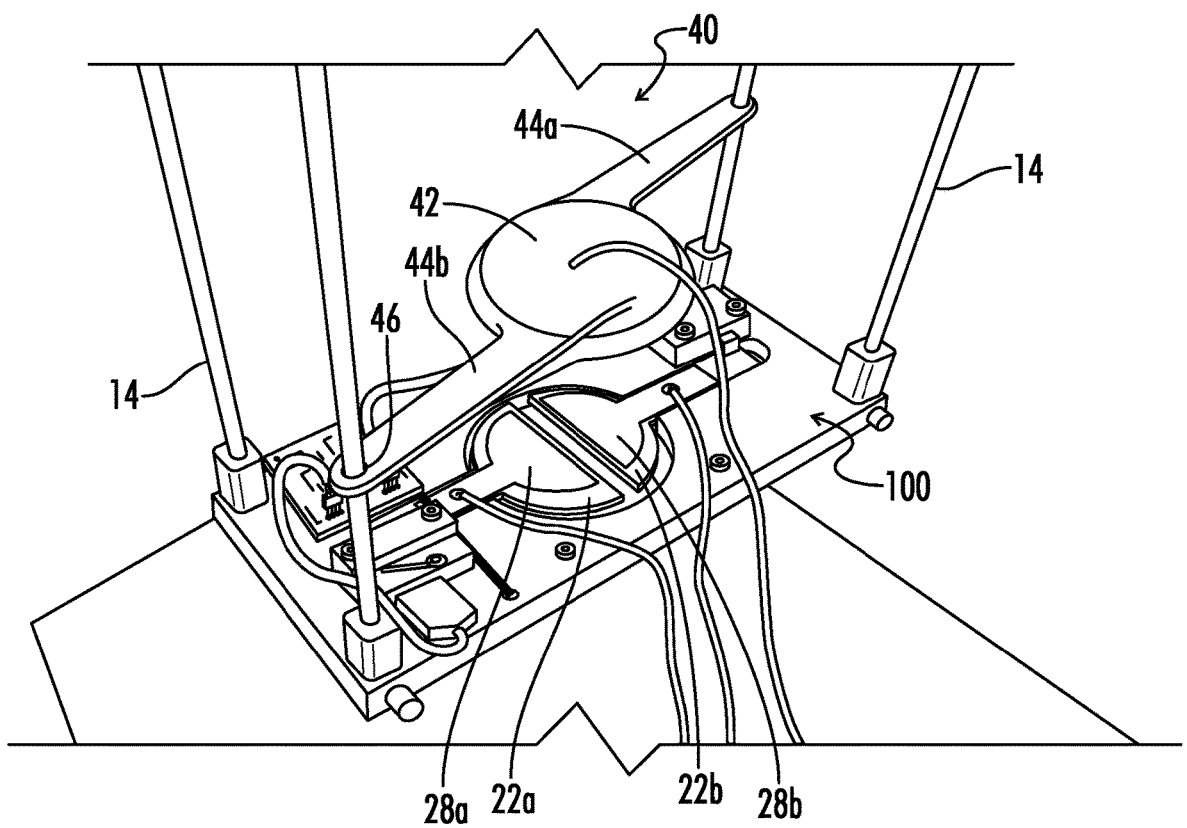
FIG. 7 shows an embodiment of a charging dome of the capture mechanism of FIG. 4.

The docking mechanism 10 further includes a charging dome 40 as shown in FIG. 7. The charging dome 40 includes a spherically shaped center 42 with two extending arms 44a and 44b. Each arm 44a and 44b includes a hole 46 through which one of the interface cables 14 extends. The charging dome 40 may be moved in an upward and downward motion along the interface cables 14 by a linear actuator or other suitable motorized device. The charging dome 40 includes charging contacts on its lower concave surface (not shown). When lowered, the spherically shaped center 42 of the charging dome 40 is positioned such that it covers the ends of flippers 22a and 22b containing charging contacts 28a and 28b.

Referring back to FIG. 2, a guidance device or pyramidal guidance cone 30 is connected to the bottom side of the capture mechanism 20. The cone 30 gradually increases in circumference (or perimeter) as the cone 30 extends downward away from the capture mechanism 20. In one embodiment, the cone 30 is constructed via 3-D processing from polycarbonate sheets. However, other manufacturing techniques for the guidance device 30 can be used in other embodiments.

Figure 8:
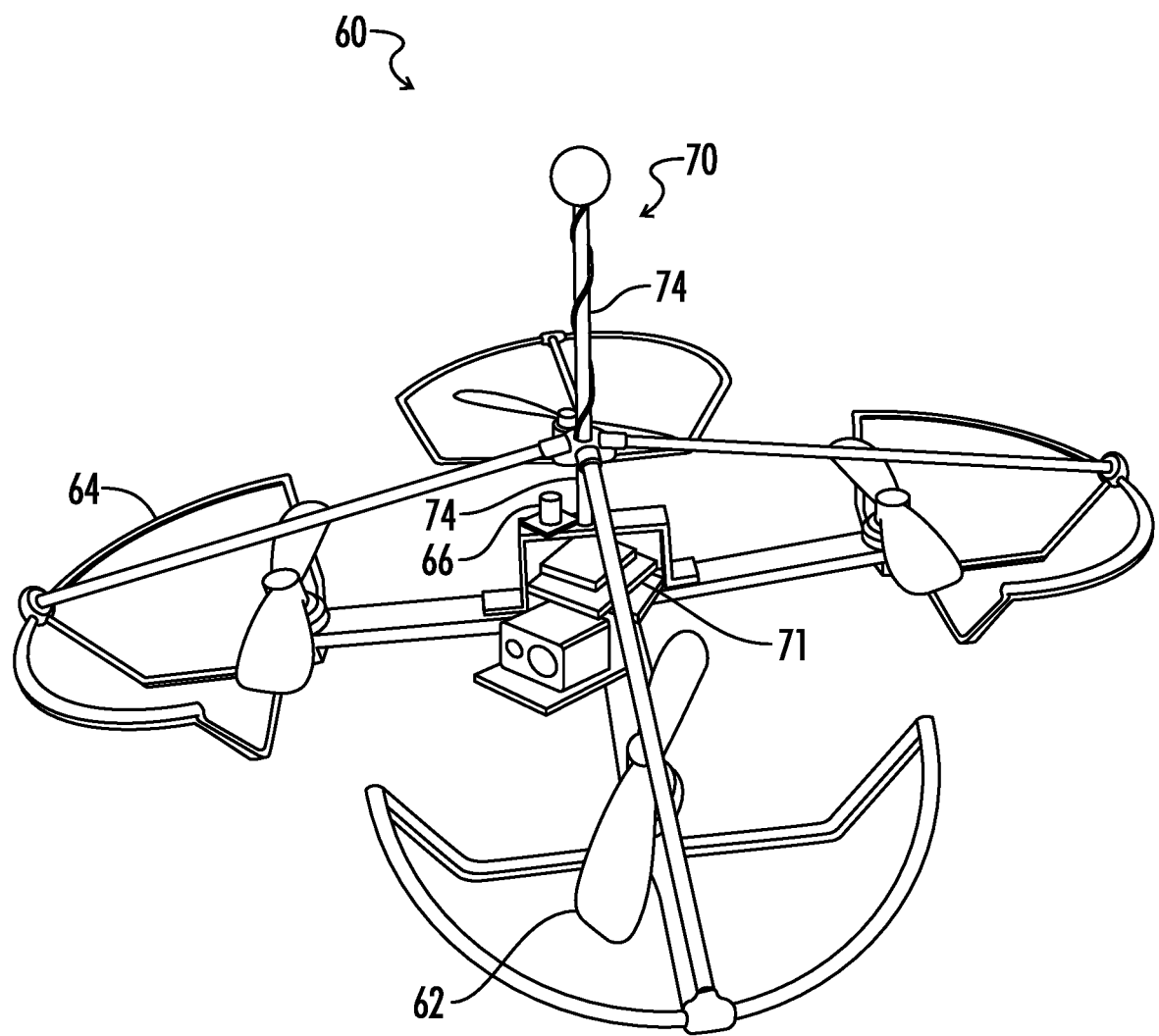
FIG. 8 shows an embodiment of a UAV.
Figure 9:
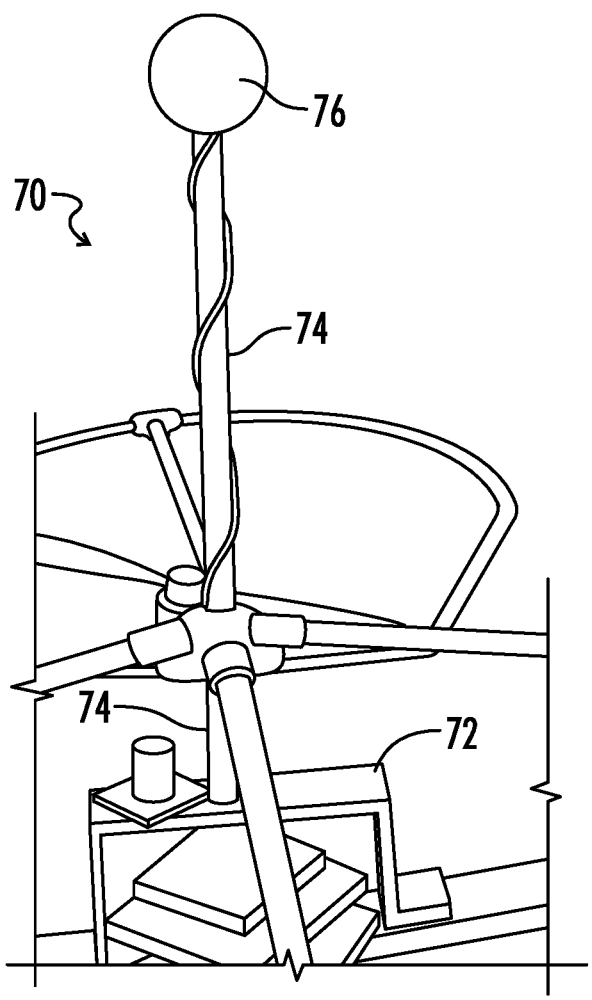
FIG. 9 shows an embodiment of a docking arm of the UAV of FIG. 8.
Figure 10:
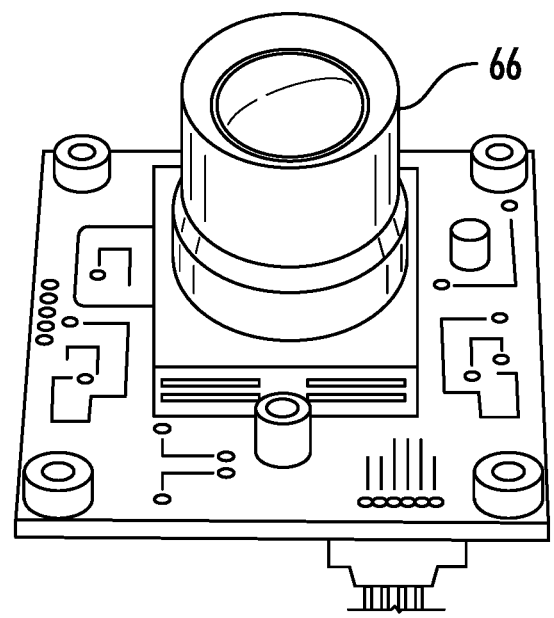
FIG. 10 shows an embodiment of a camera of the UAV of FIG. 8.
Figure 11:
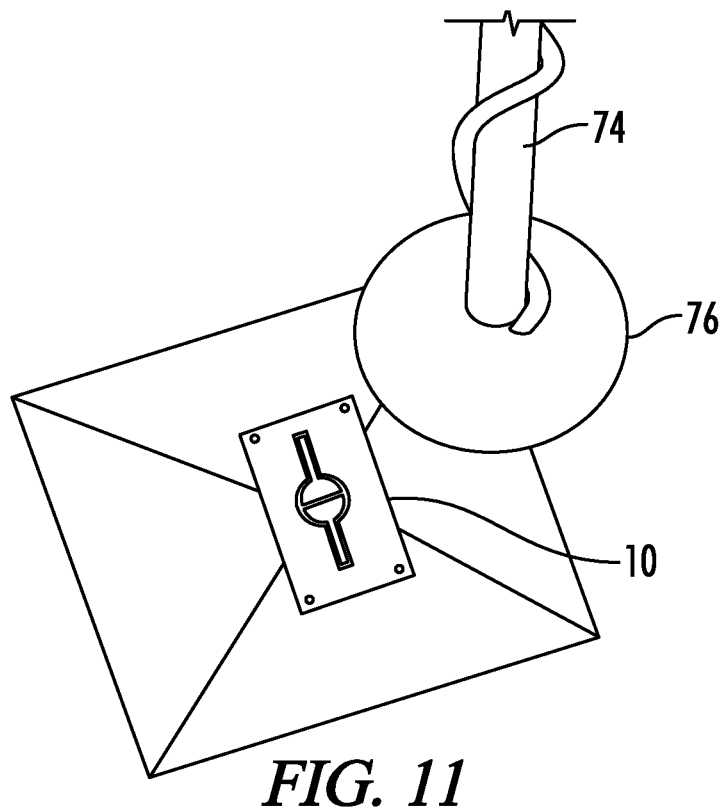
FIG. 11 shows a view from the camera of FIG. 10.

The UAV 60 will now be described with reference to FIGS. 8 and 9. The UAV 60 includes a plurality of rotors 62 with accompanying rotorguards 64. The UAV 60 also includes a docking camera 66 positioned at the center of the flight controller 71. FIG. 10 shows an embodiment of the docking camera 66 mounted on the UAV 60. The camera 66 is utilized to assist in docking the UAV 60 into the docking mechanism 10. As is known to one of skill in the art, a UAV 60 is generally operated remotely by a user through a wireless control system (not shown). The UAV 60 can include other cameras (not shown) that transmit images to the user to aid in guiding and moving the UAV 60 during flight. The camera 66 can be positioned to capture images in an upward direction as shown in FIG. 11. The captured images may be relayed back to the UAV operator (not shown) so that he or she may properly secure the UAV 60 to the docking mechanism 20.

The UAV 60 further includes a docking adapter 70 to interface with the docking mechanism 10. The adapter 70 is positioned directly above the UAV's center of mass to provide stability to the UAV 60 and extends far enough above the plane of the UAV's rotors 62 to avoid any chance of the rotors 62 contacting the docking mechanism 10 or object 12. As shown in FIG. 9, components of the adapter 70 include a bridge 72, a rod 74 and an interface element of sphere 76. One end of the rod 74 is inserted into the center of the bridge 72 and is secured to the bridge 72, for example with glue or adhesives. In other embodiments, the rod 74 can be attached to the bridge 72 using mechanical fasteners or other suitable connecting techniques. The opposing end of the rod 74 is inserted into the sphere 76. Sphere 76 interfaces with the flippers 22a and 22b and is used to secure the UAV 60 to the capture mechanism 20, as will described in more detail herein. In one embodiment, the rod 74 may include a hollow tube that may be used to direct the flow of fluid materials, for instance a fuel or a chemical substance that will be utilized by the UAV 60.

Figure 12:
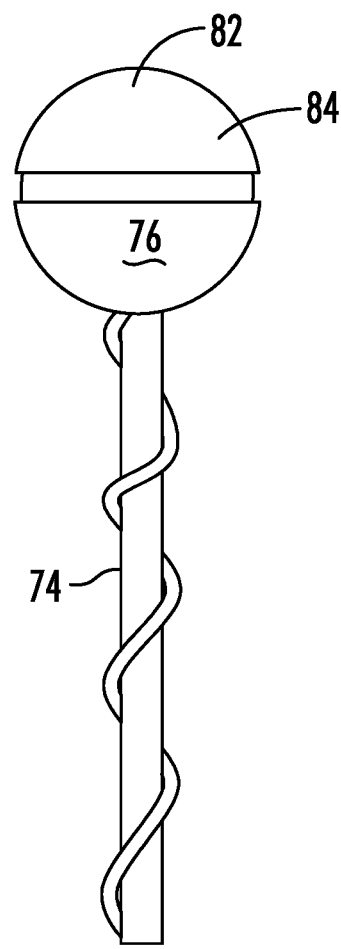
FIGS. 12 and 13 show embodiments of the charging contacts from the docking arm of FIG. 9.
Figure 13:
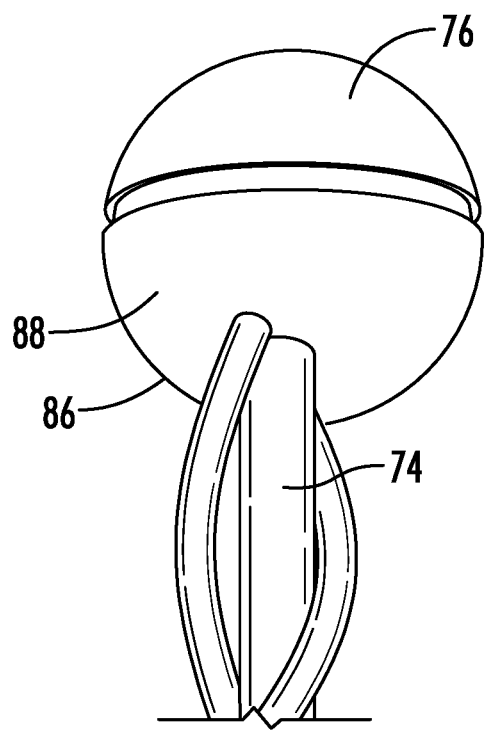

Referring now to FIGS. 12 and 13, sphere 76 further includes a positive charging contact 84 positioned on its upper portion or upper hemisphere 82. A negative charging contact 88 is located on the lower hemisphere 86 of the sphere 76. The contacts 84, 88 are utilized in charging the battery of the UAV 60, as will be described in more detail herein.

FIG. 7 illustrates one embodiment of a charging circuit 100 for charging the UAV battery. The flippers 22a and 22b contain negative charging contacts 28a and 28b to engage negative charging contact 88 on sphere 76. As described previously, a charging dome 40 includes charging contacts on its lower concave surface (not shown). As with the charging contacts 84 and 88 described with reference to the sphere 76, the charging contacts located on the charging dome 40 may be utilized in charging the UAV 60 as will be described in greater detail herein. In one embodiment, charging tape may be utilized at the charging contacts 84, 88 and to conduct current from the charging circuit 100 to the UAV battery (not shown).

Figure 14:
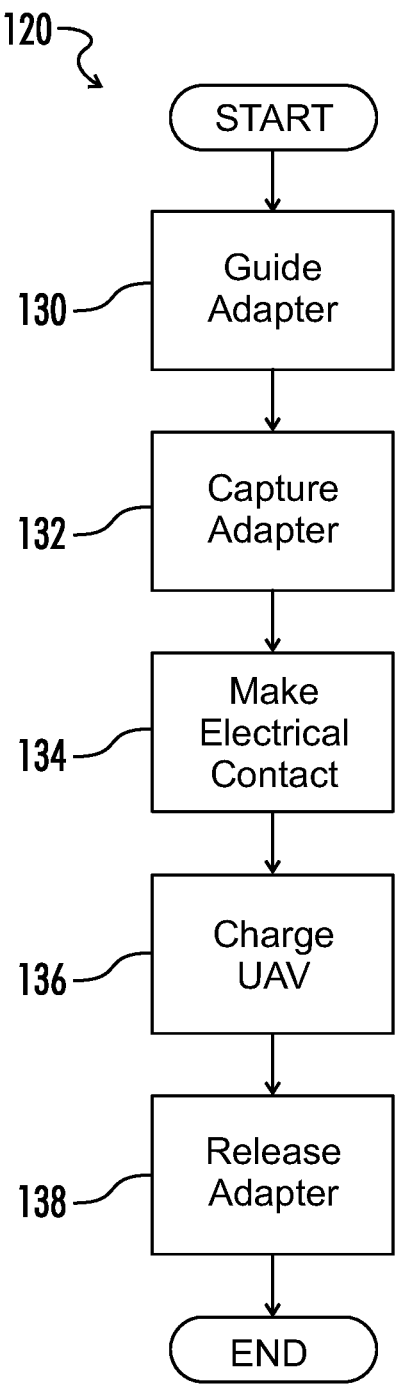
FIG. 14 shows an embodiment of a process for docking a UAV with a docking station.

FIG. 14 illustrates a method 120 of charging a UAV 60 utilizing the system of the present disclosure. The method begins with a user guiding the UAV 60 and the docking adapter 70 to the capture mechanism 20 (step 130). The user may utilize the docking camera 66 positioned at the center of the flight controller 71 to assist in docking the UAV 60 and the docking adapter 70 into the capture mechanism 20. Docking of the UAV 60 is aided by pyramidal guidance cone 30 connected to the bottom side of the capture mechanism 20. Guidance cone 30 directs the adapter 70 to the proper position on the capture mechanism 20. Once the adapter 70 is in the proper position, the UAV 60 is then secured to the docking mechanism 10 (step 132). The upward motion of the UAV 60 and adapter 70 forces sphere 76 to exert pressure on flippers 22a and 22b. The pressure from sphere 76 rotates the flippers 22a and 22b upward, allowing the sphere 76 to pass through the space between the flippers 22a and 22b (see FIG. 6A). The sphere 76 then passes through the flippers 22a and 22b. Gravitational forces allow the flippers 22a and 22b to rotate back to the horizontal position and come to rest beneath the sphere 76 (see FIG. 6B) after the sphere 76 passes through the flippers 22a and 22b. An extended pin 24 prevents rotation of each of the flippers 22a and 22b in a downward direction past the horizontal orientation. Docking in this manner, allows the UAV 60 to move within the capture mechanism 20, for example in a rocking motion. The ability to charge the UAV 60 while in motion decreases the likelihood of damage to the UAV 60 or the docking mechanism 10 during the recharging procedure.

After the capture of the UAV 60 in the docking mechanism 10, the user decreases power and throttle to the UAV 60, stopping the movement of the rotors 62 and decreasing lift of the UAV 60. As a result, the weight of the UAV 60 as transferred to the sphere 76 causes the UAV 60 to descend due to gravitational forces and come to rest on the flippers 22a and 22b. The user may then turn off the power to the UAV 60 and prevent the UAV 60 from flying. Referring again to FIG. 14, the charging contacts on the adapter 70 then make contact with the charging contacts on the capture mechanism 20 (step 134). The charging dome 40 is then moved in downward direction along the interface cables 14. The charging dome 40 includes charging contacts on its lower concave surface (not shown). The spherically shaped center 42 of the charging cone 40 is positioned such that it covers the ends of flippers 22a and 22b containing charging contacts 28a and 28b. The downward motion of the charging dome 40 causes the flipper contacts 28a and 28b to come into contact with the charging contact 88 positioned on the lower hemisphere 86 of the sphere 76. In addition, the charging dome charging contacts (not shown) come into contact with the contact 84 positioned on the upper hemisphere 82 of the sphere 76. The interaction between the above described contacts completes an electrical circuit which allows the flow of current from a power source associated with the charging circuit 100 to the UAV battery (not shown), resulting in charging of the battery (step 136).

After charging is complete, the UAV 60 may be released from the capture mechanism 20 (step 138). Here, the charging dome 40 is then moved in an upward direction along the interface cables 14. The interaction between the above described contacts disrupts the electrical circuit and stops the flow of current from the power source to the UAV battery. Pins 24 are then retracted, via movement of the actuators 26, to allow the flippers 22a and 22b unrestricted motion about their axles. Flippers 22a and 22b then rotate downwards due to the weight of the UAV as applied to the sphere 76 (see FIG. 6C). The UAV 60 falls out of the docking mechanism 10. A spring, elastic bands 90 (see FIG. 4) or other type of mechanism causes the flippers 22a and 22b to return to the horizontal position after they have rotated downward. The actuators 26 then returns the pins 24 back to their extended position. The docking mechanism 10 is then ready for a second docking and charging procedure for another UAV 60 or possibly the same UAV 60.

In another embodiment, the docking system can include a docking arm, a docking station, and a positioning scheme. The docking arm can be attached to the UAV. The UAV can use the positioning scheme to fly the docking arm to the docking station in order to dock the UAV with the docking station. The docking station can capture the docking arm, holding the docking arm securely in the docking station. Data, fuel/charge, and payload can then pass between the docking station and the UAV, via the docking arm. The use of the docking system allows the UAV to: recharge or refuel to increase the UAV's flight time; pass data to the docking station which can then provide data to a central data source, such as a server; receive data from the docking station such as updates and new information or commands from a central data source; and send and receive payloads to and from the docking station. The docking system can be used with one UAV or multiple UAVs to enable the performance of tasks that these UAVs would be unable to perform without a recharge or the exchanging of data.

Figure 15:
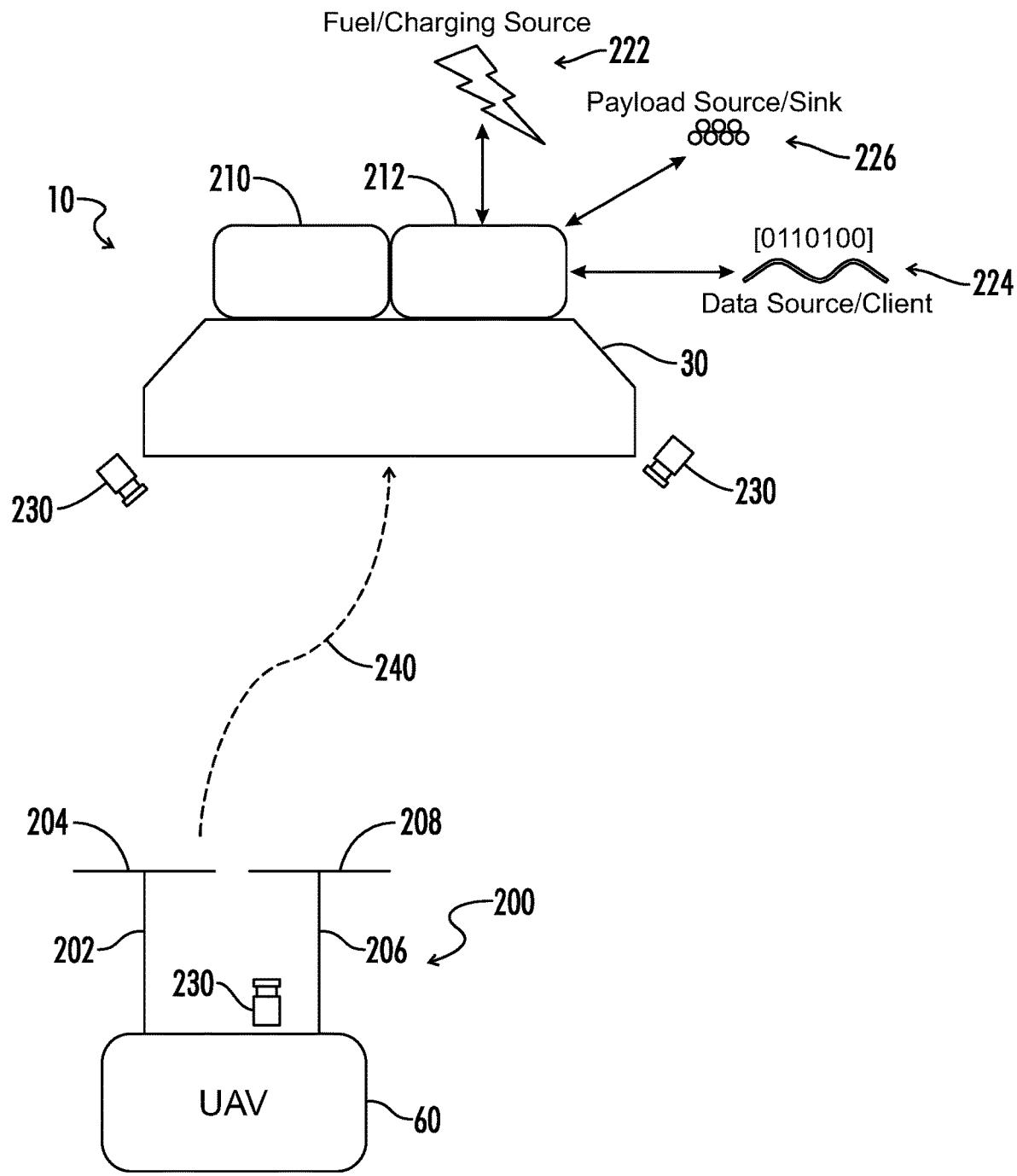
FIGS. 15 and 16 show an alternate embodiment of a UAV and docking station.
Figure 16:
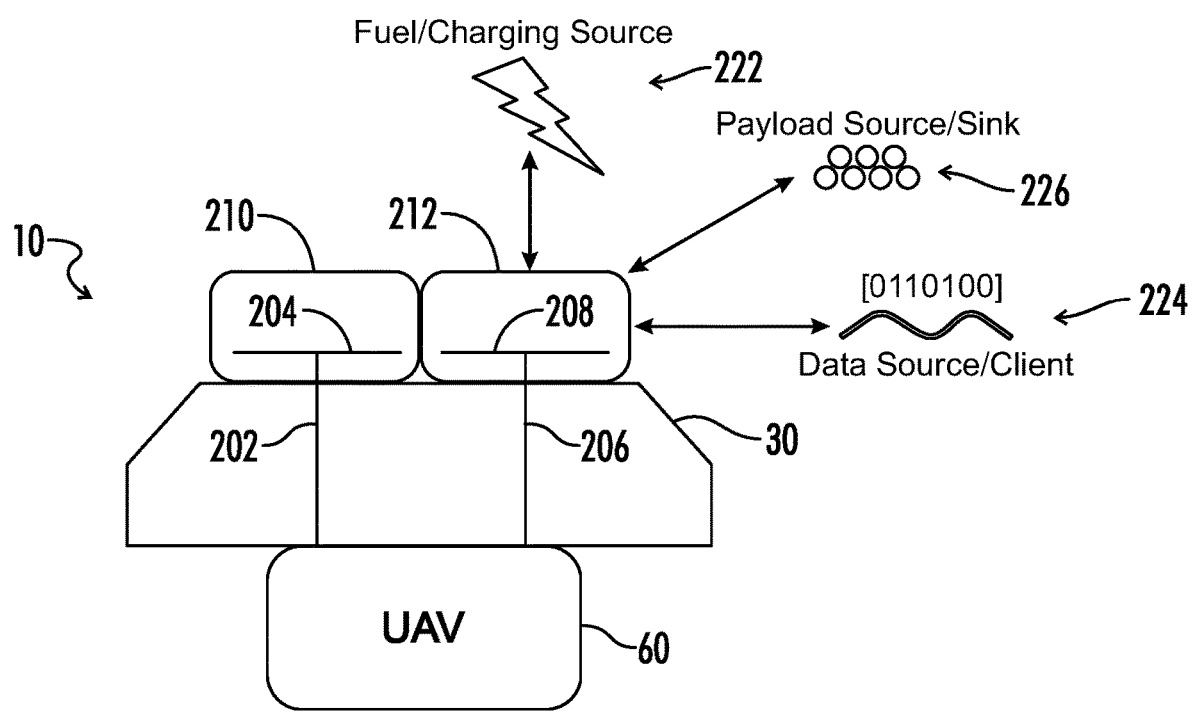

FIGS. 15 and 16 show another embodiment of the docking system 10. The docking system 10 includes a docking arm 200, a docking station 10 and a positioning scheme to enable the UAV 60 to connect to the docking station 10. The docking arm 200 can include a docking connector 202, a docking interface 204, a transfer connector 206 and a transfer interface 208. The docking connector 202 can be attached structurally to the UAV 60 and the docking interface 204. The docking interface 204 is used to interface with the docking station 10. The docking interface 204 is configured to be captured and held securely by a corresponding securing mechanism 210 in the docking station 10. The transfer connector 206 can be connected to the UAV 60 to allow data and/or fuel/charge and/or payload to pass between the UAV 60 and the transfer interface 208. The transfer interface 208 is used to interface with the docking station 10 to allow data and/or fuel/charge and/or payload to be transferred between the docking station 10 and the UAV 60. In one embodiment, the docking connector 202, the transfer connector 206, the docking interface 204, and the transfer interface 208 can be separate components connected to one another. In another embodiment, one or more of the docking connector 202, the transfer connector 206, the docking interface 204, and the transfer interface 208 may be integrated into a single component, e.g., integrating the docking connector 202 and the transfer connector 206 (see FIG. 9), integrating the docking interface 204 and the transfer interface 208 (see FIG. 9), integrating the docking connector 202 and the docking interface 204 as shown in FIG. 15, or integrating the transfer connector 204 and the transfer interface 208 as shown in FIG. 15.

The docking station 10 can include a guidance device 30, a securing mechanism 210 and a receiving mechanism 212. Once the UAV 60 is close enough to the docking station 10, the guidance device 30 can be used to guide the docking arm 200 toward the securing mechanism 210 of the docking station 10. In one embodiment, the guidance device 30 can be a cone or other geometric shape. However, in other embodiments, the guidance device 30 can use magnetic fields to guide the docking arm 200. The securing mechanism 210 can permit the docking interface 204 to enter the docking station 10 (and the securing mechanism 210) during a dock, and can prevent the docking interface 204 from exiting the docking station 10 (and the securing mechanism 210) until the docking process has concluded. In this manner, the securing mechanism 210 secures the UAV 60 to the docking station 10 by holding the docking interface 204 (and the docking connector 202) in place. The receiving mechanism 212 can be connected to a fuel/charging source 222 (e.g., a liquid fuel tank, power source, solar power source, battery exchanger, etc.) and/or a data source/client 224 (e.g., a DAQ (data acquisition) system, computer, tablet, server, wireless network, etc.) and/or a payload source/sink 226 (e.g., a seed hopper, paintball hopper, tool exchanger, etc.). The receiving mechanism 212 can connect the fuel/charging source 222, data source/client 224 and payload source/sink 226 to the transfer interface 208 to permit data and/or fuel/charge and/or payload to pass between the fuel/charging source 222 and/or data source/client 224 and/or payload source/sink 226 and the UAV 60.

The positioning scheme can include positioning sensors 230 and corresponding positioning methods that use information from the positioning sensors 230. The positioning sensors 230 (e.g., GPS (global positioning system) sensors, LPS (local positioning system) sensors, cameras, machine vision sensors, etc.) may be located either on the UAV 60, the docking station 10 or both. The positioning sensors 30 can be used in conjunction with the positioning methods to determine the position of the UAV 60 and/or the docking arm 200 relative to the docking station 10 and/or the guidance device 30. The positioning methods can be used to fly the UAV's docking arm 200 into the guidance device 30 where the docking arm 200 and the docking interface 204 can be captured by the securing mechanism 210. In one embodiment, the positioning methods can autonomously fly and dock the UAV 60 with the docking station 10 without user intervention. In another embodiment, the positioning methods can include a user (human pilot) manually flying and docking the UAV 60 with the docking station 10.

In one embodiment, the docking connector 202 can be attached to the UAV 60 and the docking interface 204 can be attached to the docking connector 204. The positioning sensors 230 can locate the UAV 60 and/or docking arm 200 relative to the docking station 10. The positioning method(s) can be utilized to fly the docking arm 200 along a path 240 (see FIG. 15) to the guidance device 30. The guidance device 30 can the guide the docking interface 204 into the securing mechanism 210. Once the docking interface 204 engages the securing mechanism 210, the securing mechanism 210 can hold the docking interface 204 in position which results in the UAV 60 being docked with the docking station 10. The receiving mechanism 212, which is attached to a data source/client 224, a fuel/charging source 222, and a payload source/sink 226, can then be connected to the transfer interface 208, which is connected to the UAV 60 via the transfer connector 206 (see FIG. 16). In one embodiment, the receiving mechanism 212 can be moved to engage the transfer interface 208. In other embodiments, the transfer interface 208 and/or transfer connector 206 can be moved to engage the receiving mechanism 212. In still other embodiments, the receiving mechanism 212 and transfer interface 208 (and/or transfer connector 206) can both be moved to engage the transfer interface 208 with the receiving mechanism 212. Data, fuel/current, and payload can then pass from the data source client 224, the fuel/charging source 222 and/or the payload sources/sink 226 via the receiving mechanism 212, the transfer interface 208, and the transfer connector 210 to the UAV 60 and vice versa.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A docking station for an unmanned aerial vehicle, the docking station comprising:
   a guidance device configured to guide an interface element connected to an unmanned aerial vehicle to an area of the docking station;
   a capture mechanism connected to the guidance device, the capture mechanism comprising:
      a first holding device and a second holding device each positioned in a base position,
      the first holding device and the second holding device configured to pivot from the base position into the area when a first force is applied to the first holding device and the second holding device by the interface element such that the interface element passes between the first holding device and the second holding device and enters the area,
      the first holding device and the second holding device configured to automatically return to the base position after at least a portion of the interface element passes corresponding ends of the first holding device and the second holding device,
      the first holding device and the second holding device configured to prevent the interface element from exiting the area when the first holding device and the second holding device return to the base position, the first holding device and the second holding device configured to support the interface element and a weight of the unmanned aerial vehicle when the interface element contacts the first holding device and the second holding device, and
      a release mechanism configured to enable the interface element to exit the area, wherein activation of the release mechanism permits the first holding device and the second holding device to pivot from the base position away from the area when a second force substantially opposite the first force is applied by the interface element to the first holding device and the second holding device such that the interface element passes between the first holding device and the second holding device; and
   a transfer mechanism configured to engage the interface element when the interface element is held in the area by the capture mechanism such that at least one of data or power is transferred from the transfer mechanism to the unmanned aerial vehicle via the interface element.

2. The docking station of claim 1, wherein the transfer mechanism comprises at least one first contact positioned on each of the first holding device and the second holding device, wherein the at least one first contact positioned on each of the first holding device and the second holding device is configured to engage a corresponding second contact on the interface element after the first holding device and the second holding device are supporting the interface element.

3. The docking station of claim 2, wherein the transfer mechanism comprises a charging dome having a plurality of third contacts, wherein the plurality of third contacts of the charging dome are configured to engage corresponding fourth contacts located on a substantially spherical portion of the interface element after the first holding device and the second holding device are supporting the interface element.

4. The docking station of claim 3, wherein the charging dome is configured to move such that the plurality of third contacts of the charging dome are moved into contact with the corresponding fourth contacts on the interface element after the first holding device and the second holding device are supporting the interface element.

5. The docking station of claim 1, wherein the capture mechanism further comprises a first member configured to prevent the first holding device from pivoting from the base position away from the area and a second member configured to prevent the second holding device from pivoting from the base position away from the area, wherein the release mechanism is configured to adjust the first member and the second member such that the first holding device and the second holding are permitted to pivot from the base position away from the area.

6. The docking station of claim 5, wherein the first member is positioned to block a pivot path of the first holding device from the base position away from the area and the second member is positioned to block a pivot path of the second holding device from the base position away from the area, the release mechanism comprises a first actuator configured to move the first member from the pivot path of the first holding device and a second actuator to move the second member from the pivot path of the second holding device.

7. The docking station of claim 1, wherein the release mechanism comprises at least one elastic device coupled to each of the first holding device and the second holding device to return the first holding device and the second holding device to the base position after the first holding device and the second holding device pivot from the base position away from the area.

8. The docking station of claim 1, further comprising a payload source connected to the transfer mechanism, wherein the transfer mechanism is configured to transfer payload from the payload source to the unmanned aerial vehicle via the interface element after the first holding device and the second holding device are supporting the interface element.

9. The docking station of claim 1, wherein the capture mechanism is configured to permit the interface element to pivot in the area after the first holding device and the second holding device are supporting the interface element.

10. The docking station of claim 1, wherein the first holding device and the second holding device automatically return to the base position by force of gravity after pivoting into the area.

11. The docking station of claim 1, further comprising at least one interface cable having a detachable connector at an end, wherein the detachable connector is configured to engage a corresponding connector on an object such that the docking station is connected to the object and suspended from the object.

12. A method for recharging an unmanned aerial vehicle, the method comprising:
guiding an interface element connected to an unmanned aerial vehicle to an area of a docking station;
inserting the interface element into a capture mechanism of the docking station, wherein inserting the interface element includes:
pivoting a first holding device of the capture mechanism and a second holding device of the capture mechanism from a base position into the area after a first force is applied by the interface element to the first holding device and the second holding device such that the interface element passes between the first holding device and the second holding device, and
entering the area with the interface element after pivoting the first holding device and the second holding device;
holding the interface element in the area with the capture mechanism, wherein holding the interface element includes:
automatically returning the first holding device and the second holding device to the base position after at least a portion of the interface element passes corresponding ends of the first holding device and the second holding device,
preventing the interface element from exiting the area with a release mechanism when the first holding device and the second holding device return to the base position, and
supporting the interface element and a weight of the unmanned aerial vehicle when the interface element is moved into contact with the first holding device and the second holding device;
transferring at least one of data or power from the docking station to the unmanned aerial vehicle via the interface element, wherein transferring at least one of data or power from the docking station includes engaging the interface element held in the area by the capture mechanism with a transfer mechanism; and
releasing the interface element from the capture mechanism after completion of the transfer of the at least one of data or power from the docking station, wherein releasing the interface element includes:
activating the release mechanism to permit the first holding device and the second holding device to pivot from the base position away from the area after a second force substantially opposite the first force is applied to the first holding device and the second holding device by the interface element, and
exiting the area with the interface element after pivoting the first holding device and the second holding device away from the area, wherein the interface element passes between the first holding device and the second holding device when exiting.

13. The method of claim 12, further comprising return the first holding device and the second holding device to the base position with at least one elastic device after the interface element exits the area and passes between the first holding device and the second holding device.

14. The method of claim 12, wherein the automatically returning the first holding device and the second holding device to the base position includes returning the first holding device and the second holding device to the base position by force of gravity.

15. The method of claim 12, further comprising transferring a payload from a payload source to the unmanned aerial vehicle via the interface element after the first holding device and the second holding device are supporting the interface element.

16. The method of claim 12, wherein the engaging the interface element held in the area by the capture mechanism with a transfer mechanism includes engaging a plurality of contacts on the interface element with corresponding contacts on each of the first holding device and the second holding device after the first holding device and the second holding device are supporting the interface element.

17. The method of claim 12, wherein the interface element has a substantially spherical shape and the transfer mechanism comprises a charging dome having a plurality of first contacts, and the engaging the interface element held in the area by the capture mechanism with a transfer mechanism includes engaging the plurality of first contacts on the charging dome with corresponding second contacts on the substantially spherical shape of the interface element after the first holding device and the second holding device are supporting the interface element.

18. The method of claim 17, wherein the engaging the plurality of first contacts on the charging dome with corresponding second contacts on the interface element includes moving the charging dome into contact with the interface element.

19. The method of claim 17, wherein the engaging the interface element held in the area by the capture mechanism with a transfer mechanism further includes engaging a plurality of third contacts on the interface element with corresponding fourth contacts on each of the first holding device and the second holding device after the first holding device and the second holding device are supporting the interface element.

20. The method of claim 12, wherein activating a release mechanism to permit the first holding device and the second holding device to pivot from the base position away from the area includes moving an impediment from a pivot path of each of the first holding device and the second holding device such that the first holding device and the second holding device are permitted to pivot away from the area.

* * * * *